(12) United States Patent
Faget-Mora

(10) Patent No.: US 7,584,614 B2
(45) Date of Patent: Sep. 8, 2009

(54) IMMANUEL SYSTEM TO PRODUCE ELECTRICITY THROUGH GEOTHERMAL ENERGY

(76) Inventor: Reinaldo Antonio Faget-Mora, 3220 La Costa Cir., Suite #101, Naples, FL (US) 34105

(*) Notice: Subject to any disclaimer, the term of this patent is extended or adjusted under 35 U.S.C. 154(b) by 421 days.

(21) Appl. No.: 11/411,479

(22) Filed: Apr. 26, 2007

(65) Prior Publication Data

US 2008/0271453 A1   Nov. 6, 2008

(51) Int. Cl.
*F01K 25/08* (2006.01)
(52) U.S. Cl. .............................. 60/651; 60/653; 60/671
(58) Field of Classification Search .................. 60/651, 60/653, 670, 671
See application file for complete search history.

(56) References Cited

U.S. PATENT DOCUMENTS 3,986,362 A * 10/1976 Baciu ........................ 60/641.2
4,415,524 A * 11/1983 Gross et al. .................. 376/216
5,008,085 A * 4/1991 Bain et al. .................... 422/109
6,647,204 B1 * 11/2003 Hutchinson .................. 392/491

* cited by examiner

Primary Examiner—Hoang M Nguyen
(74) Attorney, Agent, or Firm—William F. Hamrock

(57) ABSTRACT

A system for producing electricity by pumping a mixture of melted sodium/potassium metals through tubing within the walls of equipment which extends downward to the geothermal zone of the earth. The mixture of melted metals passes through a first heat exchange area producing steam, then passes downward through an insulated low pressure vacuum area from where it is pumped from the tubing into a high pressure, super conductive heat transfer zone at the bottom of the equipment located in the geothermal zone. The geothermal heated mixture of melted metals passes through insulated tubing in the insulated vacuum area into a super heat exchange area passing through water forming steam and into a super steamer producing super heated steam. The super heated steam passes through a line into turbines producing electricity.

19 Claims, 2 Drawing Sheets

IMMANUEL SYSTEM TO PRODUCE ELECTRICITY THROUGH GEOTHERMAL ENERGY

BACKGROUND OF THE INVENTION

1. Field of the Invention

The present system relates to a system to produce electricity. In particular, the present invention relates to the Immanuel system to produce electricity. In a first area, water is heated forming steam by means of a circulating mixture of melted sodium/potassium metals. The circulating melted mixture then passes through an insulated area of low pressure vacuum zone in insulated tubing from where it is pumped from the tubing into a subterranean geothermal source and captures geothermal heat from the geothermal source. It then passes to a heat exchanger zone where it heats water to steam. The geothermal heated metal mixture then passes into a steam heater where there is produced a boiling effect and super heated steam. The superheated steam passes to turbines to produce electricity. Exhausted steam from the turbine then heats liquid hydrocarbon forming vapor hydrocarbon which passes into a secondary turbine producing further electricity. Condensed steam from the secondary turbine is reintroduced into the system.

2. Description of the Prior Art

Pollution of the atmosphere is a world wide serious problem. Major contributors to Atmospheric pollution are systems used in producing energy, especially those system which are used to produce electricity. Many of these systems in operation today for producing electricity continue to pollute the atmosphere. Manufacturers have seen the dilemma and have tried to clean up their systems. Unfortunately, there continues to be a very serious pollution problem with systems producing electricity. Accordingly, it can be seen that there exists to be a very critical need for a clean system for producing electricity which does not contaminate the atmosphere.

As will be seen, the present invention achieves the intended purposes, objectives and advantages by accomplishing the needs as identified above, through a new, useful and unobvious Immanuel system.

SUMMARY OF THE INVENTION

The present Immanuel system solves many of the problems of the prior art by being a completely clean system. It does not use contaminating material and does not contaminate the atmosphere. The system uses available geothermal heat as the main source of the energy. The mixture of melted sodium/potassium metals has low viscosity and density resulting in saving energy in the pumping of the melted mixture of metals. Thus, smaller diameter tubing can be used for pumping of the melted mixture of metals. Also, there are safety measures provided in the lines of the heated melted mixture of sodium/potassium metals in case of emergency, for example, a nitrogen injection system for rapid evacuation of the melted mixture of metals from the system, and to dry and pressurize the system. As a safety precaution, the equipment zone where the mixture of metals is geothermal heated shall be placed one hundred to two hundred meters within the zone to avoid heat inversion.

Large amounts of electricity can be made. A hydrogen accumulator can be used to take advantage of the large amounts of electricity produced. A further advantage is there is a low consumption of chemical products for the makeup of water in the steam system. The melted mixture of sodium/potassium is pumped to the bottom of the equipment where it receives the geothermal heat from the geothermal heat area of the earth, and rises to the Immanuel system heat exchanger. Steam that is produced in the heat exchanger area is super heated with the geothermal heated mixture of sodium/potassium metals. The heat exchanger in the Immanuel system has two heat cycles.

The zones of the system surpass one hundred and twenty degrees centigrade. In zones of lower temperature the mixture of sodium/potassium have higher concentrations of potassium. The mixture of sodium and potassium metals is made according to the geothermal zone. The melted mixture of sodium/potassium metals has low viscosity and density allowing for smaller diameter tubing; it is non-corrosive leading to longer operational life of the equipment.

The present technology is workable in non-porous conditions unlike other systems. The metal in the heat transfer zone has a high coefficient of transfer of heat having mechanical properties to resist high pressure, 100 ATM or 1470 psi/1000 m of depth. The thickness of the super conductive cement is constructed with affordability in mind in zones with porous rocks. In zones with non-porous rocks, the system works effectively with an intimate contact with metal and rock.

Large amounts of electricity can be made. A hydrogen accumulator system can be built to take advantage of all of the electricity produced. There can be a permanent indicator of the geothermal temperature zones. A computerized three-dimensional temperature curve that is working in conjunction with the melted metal pumps speed indicator.

BRIEF DESCRIPTION OF THE DRAWINGS

The forgoing and other features of the present invention will become more fully understood from the detailed description and the accompanying drawings, wherein.

PARTS LIST

Figure 1:
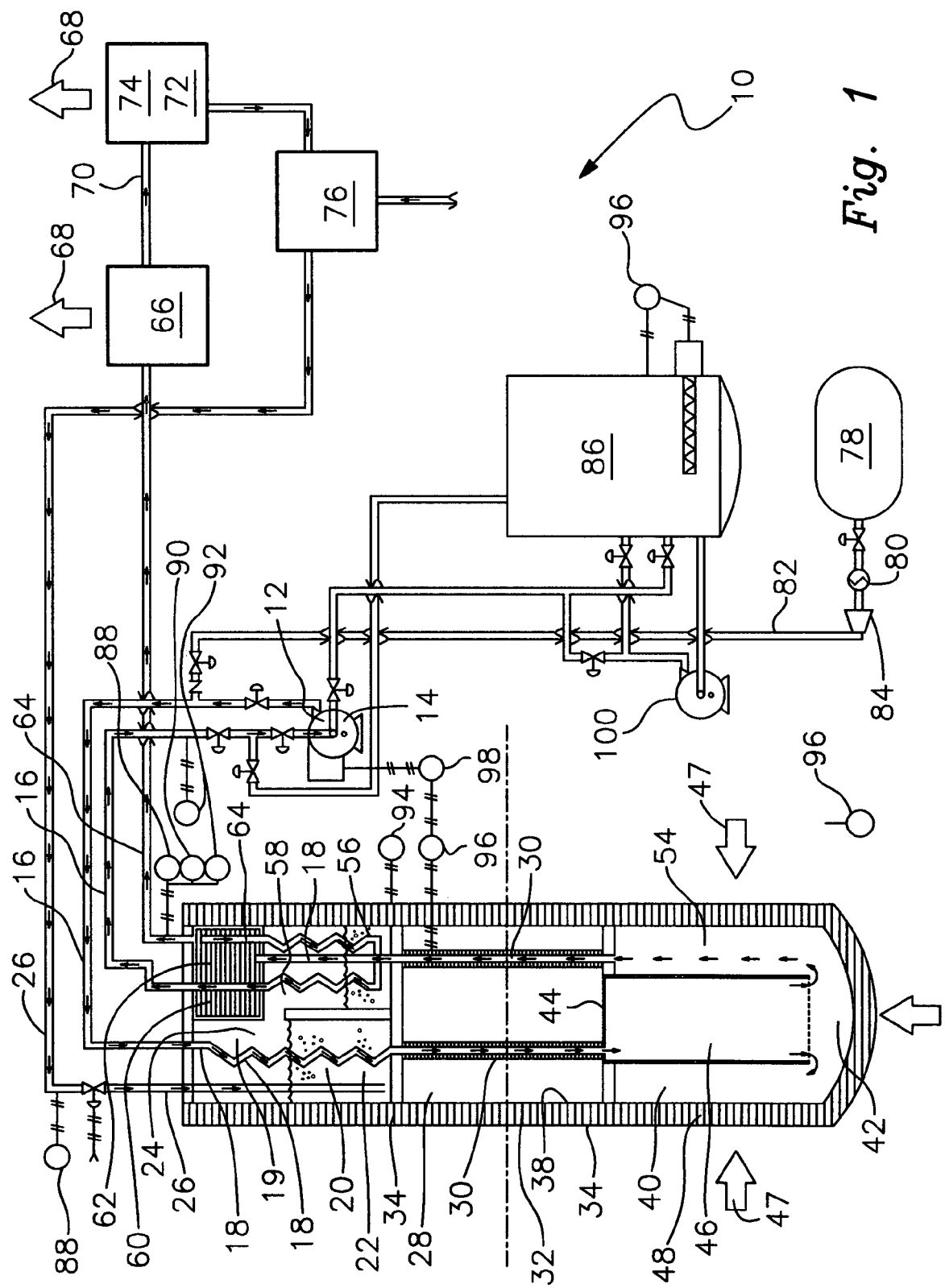
FIG. 1 represents a schematic view of the overall operation of the tubular system of circulating a heated mixture of sodium/potassium metals into the subterranean geothermal zone of the earth from which the geothermal heated mixture passes through the system forming super heated steam which passes into turbines producing electricity.

10 Immanuel system
12 Melted mixture sodium/potassium metals
14. Variable speed circulation pump
16. NaK metal tubing
18. NaK copper tubing
19. First heat exchange area
20. Water
22. Water tank
24. Steam
26. Water tubing
28. Central vacuum zone of the system
30. Insulated tubing
32. Insulating cement wall
34. Insulating cement
36. Insulated metal casing
38. Interior metal wall 40. High pressure heat transfer zone
42. Lowest stage of system
44. Annular metal plate
46. Large open ended copper pipe
47. Geothermal heat
48. Super conducting cement
50. Covered metal wall
52. Interior metal wall
54. Super heat exchange zone
56. Overflow water tank
58. Heat exchange zone
60. Super steamer
62. Parallel copper plates
64. Steam line
66. Primary turbines
68. Electricity
70. Escape vapor
72. Secondary turbine
74. Liquid hydrocarbons
76. Recovery system for condensed water
78. Liquid nitrogen tank
80. Vaporizer
82. Line for nitrogen gas
84. Compressor
86. Emergency containment unit
87. Equipment angle
88. Temperature indicator
90. Pressure indicator
92. Flow indicator
94. Level indictor control
96. Temperature indicator control
98. Speed indicator control
100. Circulation storage pump

DESCRIPTION OF THE PREFERRED EMBODIMENT

As illustrated in FIGS. 1-4, depicted is Immanuel system 10 of the invention of equipment in tubular form which extends downward into the subterranean geothermal zone of the earth. Shown in FIG. 1 is a mixture of melted sodium and potassium metals 12 melted in variable speed circulation pump 14 at a temperature which will avoid solidification. The use of a mixture of melted sodium/potassium metals increases the heat conductivity one hundred and thirty times faster than water. It achieves rapid circulation of the fluid and increases the heat power per area.

Figure 2:
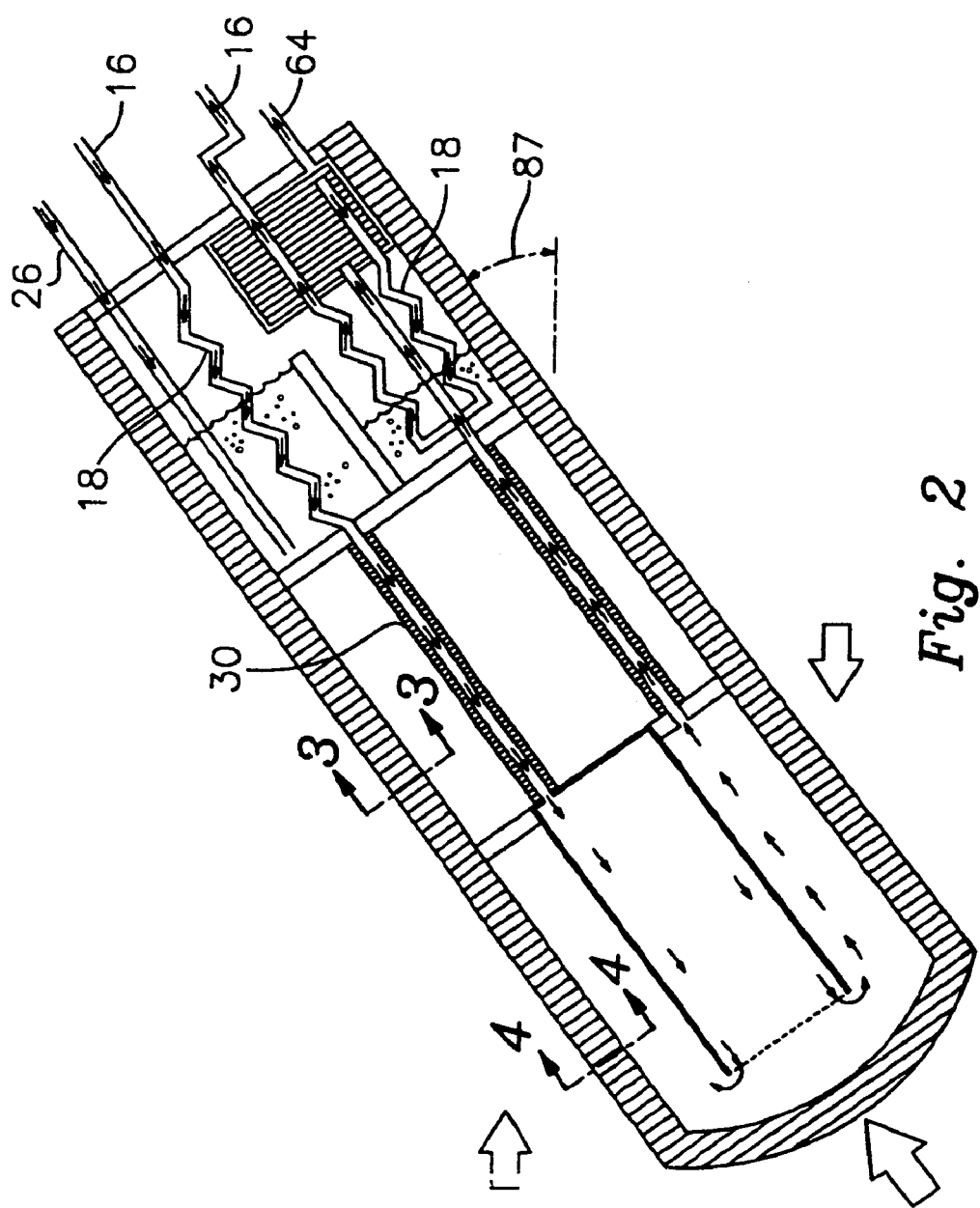
FIG. 2 represents a schematic view of an embodiment of the invention wherein the system is inclined at an angle extending into the earth and the subterranean zone.

As shown in FIGS. 1 and 2, the heated sodium/potassium mixture 12 flows through NaK metal tubing 16 into NaK copper tubing 18. The copper tubing passes down through first heat exchange area 19, down through water 20 in water tank 22 heating the water to produce steam 24 in the surrounding area. Steam also flows into the area from an upper portion of super steamer 58 to be discussed. The water is supplied to water tank 22 through water tubing 26.

Figure 3:
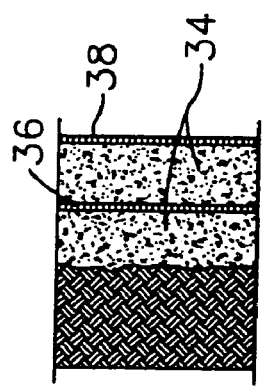
FIG. 3 represents a cross section view of the exterior insulating cement wall.

The melted mixture of sodium/potassium is pumped through NaK copper tubing 18 passing through water tank 22 down into insulted tubing 30 in central, insulated, low pressure vacuum zone 28. The central vacuum zone extends downward into about one hundred to two hundred meters of the geothermal area of the earth. In the central vacuum zone 28, the insulated tubing comprises insulated exterior casings encompassing an interior metal tubing preferably aluminum based insulation material. Shown in FIG. 3 is a cross section of the exterior insulating cement wall 32 of the low pressure central vacuum zone 28. the structure of cement wall 32 includes insulating cement 34 enclosing each side of metal wall casing 36 and abutting interior metal wall 38 which has heat insulation properties.

Figure 4:
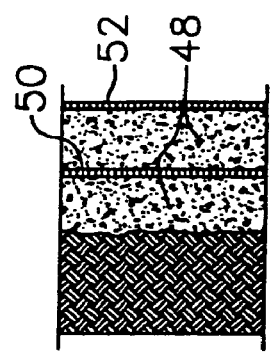
FIG. 4 represents a cross section view of the superconducting wall of the high pressure external heat transfer zone.

After passing downward through the central vacuum zone 28, the mixture of melted sodium/potassium metals 12 is pumped from the insulated tubing 30 into the external heat transfer zone 40 in the lowest stage 42 of the system located deeply within the geothermal area of the earth. The melted mixture of sodium/potassium metals from insulated tubing 30 is pumped through an opening in annular metal plate 44 passing down through large open ended copper pipe 46 which extends downward within high pressure heat transfer zone 44 at the bottom of the system. After passing through large open ended copper pipe 46, the mixture of melted sodium/potassium rises in the heat transfer zone 40 receiving geothermal heat 47 through the high thermal conductivity cement walls of the heat transfer zone 40 forming super heated mixture of sodium/potassium metals. Shown in FIG. 4 is a cross section of the super conducting wall of the high pressure external heat transfer zone 40 comprising super conducting cement 48 enclosing each side of the metal wall casing 50 abutting interior metal wall 52 having high heat conductivity properties. Heating is accelerated by super conducting cement 48.

After rising from the lowest stage 42 of the system, the geothermal heated mixture of sodium/potassium metals passes upward through smaller diameter insulated tubing 30 up through the central vacuum zone 28 of the system into super heat exchange zone 54.

In super heat exchange zone 54, the geothermal heated mixture of melted sodium/potassium metals is pumped upward through NaK copper tubing 18 in the super heat exchange zone, up through water 20 in overflow water tank 56, heating the water to produce steam 24 within heat exchange zone 54 and first heat exchange area 19. The geothermal heated mixture of melted sodium/potassium passes upward into super steamer 60 comprised of multitude of parallel copper plates 62 wherein it super heats the steam producing a boiling effect flowing the super heated steam through steam line 64 into primary turbines 66, and also flowing steam into the heat exchange areas 54 and 19. The melted mixture of sodium/potassium metals from the super steamer 60 passes into NaK copper tubing recirculating through overflow water tank 56 and out through NaK line to variable speed circulation pump 14 for recirculating through the system.

The superheated steam passes through steam line 64 to the primary turbines 66 where it produces electricity 68. Escape vapor 70 passes through steam line 64 to secondary turbine 72 where it heats liquid hydrocarbons 74 for a secondary production of electricity. The gaseous hydrocarbon at high pressure will move to a secondary turbine to produce additional electricity. The condensed water recovery system 76 circulates water back to the system through water line 26.

In case of an emergency, an emptying system will automatically empty the system of melted mixture of sodium/potassium metals. This system includes a liquid nitrogen tank 78 producing gaseous nitrogen through vaporizer 80 with resistance to electricity through gaseous nitrogen line 82 pressurized with compressor 84 pressurizing the system. An emergency containment unit 86 is provided for melted sodium/potassium metals.

The Immanuel system as depicted in FIG. 2 is inclined at an angle 87 passing into the earth which increases the heat transfer of the equipment.

The operation of the system is controlled by temperature indicator 88 of water tubing 26 and steam line 64, pressure indicator 90 of steam line 64, flow indicator 92 of steam line 64 and return NaK line 16, level indicator control 94 of exterior wall above central vacuum zone 28, temperature indicator control 96 of return insulated tubing pipe 30, and speed indicator control 98 of return insulated pipe 30 and variable speed circulation pump 14.

It will be understood that various modifications can be made to the embodiments of the present application described herein without departing from the spirit and scope thereof. Therefore, the above description should not be construed as limiting the application, but merely as preferred embodiments thereof. Those skilled in the art will envision other modifications within the scope and spirit of the application as defined by the claims appended herein.

What is claimed is:

1. An enclosed system for producing electricity comprising, a pump for pumping a mixture of melted sodium/potassium metals within walls of the system, the mixture of melted metals passes within tubing through a first heat exchange zone of water to form steam and the heat exchanged melted metals passes in a first insulated tubing down through an insulated low pressure vacuum zone, the mixture of metals from the insulated tubing in the vacuum zone passes into a large open ended pipe extending downward into a bottom area of a geothermal energy source located deeply within the geothermal area of the earth wherein the mixture of metals receives geothermal energy, the geothermal energy mixture of melted metals passes from the geothermal source within a second insulated tubing upwardly in the low pressure vacuum zone, the geothermal treated metal mixture from the second insulated tubing passes in tubing through water in a second heat exchange zone, to form steam, and the treated metal mixture passes through a third heat exchanger, a steamer forming super heated steam, the super heated steam passes through turbines to produce electricity.

2. The system according to claim 1 wherein the mixture of melted sodium/potassium metals first passes from a variable speed circulation pump through the tubing into a first heat exchange area through a tank of heated water to form steam.

3. The system according to claim 2 wherein the water in the tank is heated by the mixture of melted metals in copper tubing which then passes downward into an upper vacuum zone through insulated tubing.

4. The system according to claim 3 wherein the insulated tubing comprises metal tubing having its exterior surfaces protected with insulating material forming an insulated line.

5. The system according to claim 4 the central vacuum zone comprises insulated exterior walls having insulating cement encompassing a metal wall which abuts an interior metal wall.

6. The system according to claim 5 wherein the mixture of melted metals passes from the insulated line into a bottom geothermal heating zone of the system.

7. The system according to claim 6 wherein the mixture of melted metals enters through an annular plate into the bottom geothermal heating zone of the system.

8. The system according to claim 7 wherein the annular plate is made of metal.

9. The system according to claim 7 wherein the mixture of the melted metals passes through a large, central, open ended pipe in the geothermal heating area and is geothermal heated.

10. The system according to claim 9 wherein the open ended pipe is made of copper.

11. The system according to claim 9 wherein walls of the bottom geothermal heating zone heat capturing stage have super conducting cement.

12. The system according to claim 9 where wherein the geothermal heated melted mixture of metals rises upwardly through copper tubing through a second water tank forming steam.

13. The system according to claim 12 wherein the geothermal heated mixture of sodium/potassium passes through a heat exchange steamer where it super heats the steam to form super heated steam.

14. The system according to claim 13 wherein the super heated steam passes through a steam line to a primary turbine to produce electricity.

15. The system according to claim 13 wherein the mixture of sodium/potassium passes into copper tubing and circulates through the second water tank into a Na/K line to the variable speed circulation pump.

16. The system according to claim 14 wherein escape vapor from the primary turbine heats liquid hydrocarbons for a secondary production of electricity.

17. The system according to claim 15 wherein the steam passes to water recovery system which circulates through a water line to the tank.

18. The system according to claim 1 wherein an emergency system automatically pumps gaseous nitrogen through the NaK line.

19. The system according to according to claim 2 wherein the mixture of melted metals is heated in the variable speed circulation pump to prevent solidification.

* * * * *